(12) United States Patent
Gruedl

(10) Patent No.: US 9,046,277 B2
(45) Date of Patent: Jun. 2, 2015

(54) CURVED AIR VENT

(75) Inventor: Alexander Gruedl, Teuschnitz (DE)

(73) Assignee: Dr. Schneider Kunststoffwerke GmbH, Kronach (DE)

( * ) Notice: Subject to any disclaimer, the term of this patent is extended or adjusted under 35 U.S.C. 154(b) by 795 days.

(21) Appl. No.: 13/377,206

(22) PCT Filed: Aug. 10, 2010

(86) PCT No.: PCT/EP2010/061622
§ 371 (c)(1),
(2), (4) Date: Dec. 9, 2011

(87) PCT Pub. No.: WO2011/029683
PCT Pub. Date: Mar. 17, 2011

(65) Prior Publication Data
US 2012/0083195 A1   Apr. 5, 2012

(30) Foreign Application Priority Data

Sep. 8, 2009   (DE) .................... 20 2009 005 250 U

(51) Int. Cl.
   *B60H 1/34*   (2006.01)
   *F24F 13/06*   (2006.01)
   *F24F 13/14*   (2006.01)

(52) U.S. Cl.
   CPC .......... *F24F 13/06* (2013.01); *F24F 2013/1453* (2013.01); *B60H 1/3421* (2013.01); *B60H 1/3414* (2013.01); *B60H 2001/3492* (2013.01); *F24F 2013/1473* (2013.01)

(58) Field of Classification Search
   CPC ........... B60H 2001/3492; B60H 1/247; B60H 1/3421; F24F 2013/1473; F24F 2013/1453; F24F 2013/1433
   USPC .................................................. 454/152, 155
   See application file for complete search history.

(56) References Cited

U.S. PATENT DOCUMENTS

| 2,492,506 | A | * | 12/1949 | Stinnett | 454/124 |
| 2,864,301 | A | * | 12/1958 | Katz | 454/317 |
| 3,252,398 | A | * | 5/1966 | First | 454/317 |
| 3,683,787 | A | * | 8/1972 | Cary | 454/317 |
| 4,339,991 | A | * | 7/1982 | Asano et al. | 454/317 |

(Continued)

FOREIGN PATENT DOCUMENTS

| DE | 20 2004 006 257 | 7/2004 |
| EP | 1 389 543 | 2/2004 |

(Continued)

OTHER PUBLICATIONS

International Search Report of PCT/EP2010/061622, Sep. 9, 2010.

*Primary Examiner* — Steven B McAllister
*Assistant Examiner* — Frances F Hamilton
(74) *Attorney, Agent, or Firm* — Collard & Roe, P.C.

(57) ABSTRACT

An air vent for conducting air flows, particularly for heating, air conditioning and ventilation systems in motor vehicles, has at least one housing, a shaft having air deflecting disks attached thereto, and a rotary drive for adjusting the shaft. In order to enable a high degree of design freedom, the housing of the air vent has an air outlet channel having a longitudinally curved structure, or such an air outlet channel is attached to a housing, and the shaft is a flexible shaft or a universal shaft, and the air deflection disks are attached to the shaft in a fixed or loose but rotationally secured manner and rotate with the shaft.

19 Claims, 2 Drawing Sheets

(56) References Cited

U.S. PATENT DOCUMENTS

Figure 1:
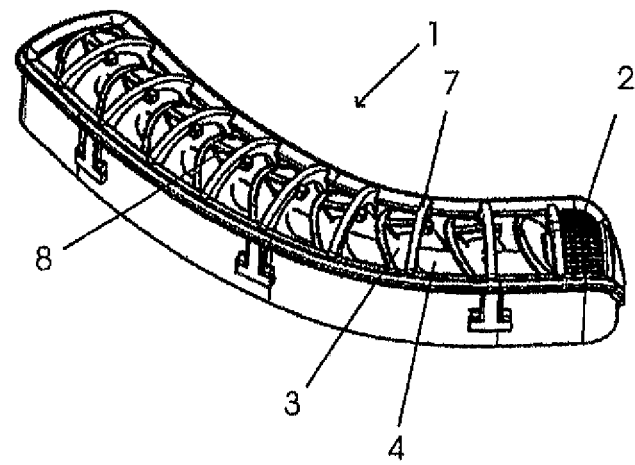

| | | | |
|---|---|---|---|
| 4,892,288 A * | 1/1990 | Norbury et al. | 251/306 |
| 5,176,567 A * | 1/1993 | Piritore et al. | 454/155 |
| 5,188,561 A * | 2/1993 | Nissimoff et al. | 454/256 |
| 5,613,750 A * | 3/1997 | Roe | 362/26 |
| 2007/0232215 A1 * | 10/2007 | Mateus | 454/107 |
| 2010/0124876 A1 * | 5/2010 | Yu et al. | 454/155 |

FOREIGN PATENT DOCUMENTS

| | | |
|---|---|---|
| EP | 1 457 371 | 9/2004 |
| FR | 2 809 349 | 11/2001 |
| JP | 201015931 A * | 7/2010 |

* cited by examiner

CURVED AIR VENT

CROSS REFERENCE TO RELATED APPLICATIONS

This application is the National Stage of PCT/EP2010/061622 filed on Aug. 10, 2010, which claims priority under 35 U.S.C. §119 of German Application No. 20 2009 005 250.8 filed on Sep. 8, 2009. The international application under PCT article 21(2) was not published in English.

The invention relates to an air nozzle for conducting air flows with the features indicated in the preamble of claim 1.

Air nozzles are nozzles which are installed in, for example, heating, air-conditioning or ventilating installations in order to conduct air flows to a specific location or space. The air nozzles are for that purpose connected with an air supply hose or an air supply duct which is usually mounted at the rear side of the air nozzle. The air nozzles have air deflecting means, such as, for example, slats which are to deflect the air in a desired direction. These air deflecting means can be mounted to be movable so as to enable adjustment of the air flow direction. As a rule, a drive—manual or electrical, such as, for example, a setting wheel or a motor for adjusting the air deflecting means, by way of which the air deflecting means are adjusted—is mounted at this kind of air nozzle. However, there are also variants of air nozzles which do not have air deflecting means, but only an air outlet opening with a grille structure or other air passage openings provided for covering the air nozzle. Air nozzles of the known kind have a rectilinear or round structure.

An air nozzle in a rectilinear and polygonal housing is described in DE 20 2004 006 257 U1. The air deflecting means are oval or round discs or have a free shape. The discs are arranged parallelly on a rigid shaft in an inclined setting so that on rotation of the shaft they produce a change in the air flow direction. A similar construction of nozzle is known from U.S. Pat. No. 5,188,561 A.

Starting from the state of the art the invention has the object of creating an air nozzle, particularly for heating, air-conditioning and ventilating installations in motor vehicles, which can be used in the most diverse area conditions and takes into consideration different shape conditions of the wall in which it is to be installed and offers a higher level of design freedom, but nevertheless shall be capable of being produced economically.

The invention fulfils the object by construction of the air nozzle in accordance with the features indicated in claim 1. Further details and forms of embodiment are described in detail in the subclaims.

The invention makes it possible for the air outlet channel to have any desired longitudinally curved structure and yet be occupied with air deflecting discs which are fastened on a flexible shaft or an articulated shaft to be secure against rotation relative thereto or are mounted to be pivotable in longitudinal direction through a defined angle. The flexible shaft can obviously be supported by way of bearings arranged to be distributed over the length of the air outlet channel. If the air outlet channel is not constructed to be of great length, then this is not necessary. If, however, this has a length of, for example, 15 to 20 centimeters then it is recommended to support the shaft not only at the side sections, but also to additionally support it by means of a further bearing, for example in the middle section. A corresponding bearing point then has to be provided in the channel.

The channel can in principle be an open air outlet channel so that the air deflecting discs are completely visible. However, the channel can also be provided with a cover or screen which, for example, has ribs, whereby the design is predetermined. The cover can also consist of an apertured surface or have an otherwise interrupted surface so as to enable issue of air in the desired manner. The channel itself can also have, or the radii of the air deflecting discs have, a correspondingly adapted shell shape. However, the channel should be designed so that there is no noticeable narrowing relative to the maximum width of the discs, so as to enable exit of the air flow in desired manner.

The housing of the air nozzle is constructed in classic form and extends in the space behind a vehicle wall, for example a dashboard, and is connected at the rear side with an air supply duct. The air outlet channel can now be directly formed on at the front side. However, the air outlet channel can also be made as an individual part of, for example, plastics material or metal and connected with the housing. A closure flap is usually disposed in the housing itself in order to be able to set the air supply by way of a setting wheel. Such housings are usually made of plastics material, but in principle they can also be made of other materials, for example metal or wood. This equally applies to the air outlet channel.

Moreover, not only the cross-sectional shape, but also the cross-sectional width can be selected to be as desired. In that case, for example, sections can have a greater width and other sections a smaller width. Insofar as the air deflecting discs are provided in these regions, they are to be appropriately adapted in diameter to the widths. In order to ensure lateral support, the diameters can be so matched to the clear widths that the end faces bear at least punctiformly against the inner sides of the air outlet channels.

In order to avoid rattling noises the air deflecting discs can also be guided to bear against annular guide paths which are formed from ribs in the air outlet channel and in the cover or screen. On the one hand it is possible to radially form in a disc only a single bearing recess by which the disc is placed on such a rib and guided during rotation. However, it is also possible, on at least one side of an air deflecting disc, to provide, for example to injection-mould in place when the disc consists of plastics material, a guide element having at least one guide groove which engages on the arcuate guide of the rib arrangement. As a result, the shaft is additionally also supported at the same time. Further supports are then not required, not even when the shaft is of very long construction. In order to achieve precise guidance it is also possible to provide two guide elements which are arranged offset by 180° at the two sides of the discs and which extend from the edge regions parallelly to the axis and over a part of the depth of the inclined course of the disc. These guide elements engage by the guide grooves on two adjacent guides.

The air outlet channel can have any desired two-dimensional or three-dimensional curved shape. For example, an L-shape, an S-shape or a wavy shape is possible. Moreover, adaptation to a third-dimension curvature of the dashboard can take place without the desired effect of deflection of the air flow thereby being impaired. This also applies to air outlet channels which are mounted on a housing at right-angles, just as to those receiving their air supply laterally from a housing of the nozzle.

A setting or control wheel can be mounted laterally at the air outlet channel in classic form as rotary drive for the shaft. The air outlet channel can also be arranged to extend at both sides at a housing of a nozzle or also only at one side. All this is permitted by the design of the air outlet channel in accordance with the invention with the internally disposed flexible shaft. It is obviously also possible to couple the shaft with an electric-motor drive which is controlled to be switchable, for example by way of buttons, in order to enable desired adjustments of the air output by lefthand or righthand rotation. The air deflecting discs provided on the shaft produce a quasi oscillating deflection during the rotation. The air outlet channel can also consist of a row of spherical sections in which discs are symmetrically or asymmetrically arranged on the continuous flexible shaft and respectively form a closed outer spherical structure. If in this case a cover with air outlet openings is provided, this is to be adapted to the spherical shape if the deflecting means protrude from the channel.

In principle, the shaft can be limited in rotational angle by an abutment. However, it can also be constructed to be continuously rotatable without limitation. Thus, for example, it is possible to enable a 90° or a 180° or 270° rotation or even a 360° rotation or, moreover, a continuous rotation in order to be able to set the air deflection in desired manner. If the rotational angle is limited, then the adjustment can be changed in desired manner only by lefthand and righthand rotation. The air deflecting discs and/or the setting wheel is or are preferably mounted on the shaft by mechanically positive couple. However, they can also be mounted thereon by a frictional connection, for example by a detent spring. In each case the parts have to be mounted on the shaft to be secure against rotation relative thereto.

If the shaft is produced together with the air deflecting discs in an injection-moulding method from plastics material the discs and the shaft in the case of manufacture in a two-component injection-moulding method can be produced at the same time from different plastics material. However, a separate production of the shaft and the discs is also possible. The discs thereafter then have to be correspondingly pulled on and fastened. The air deflecting discs can obviously also be formed to be oval or also have a free shape. This has to be taken into consideration in each instance in the cross-sectional design of the channel so that no rubbing against the walls takes place. In order to achieve specific air turbulence, the air deflecting discs can be constructed with a flat, bent, wavy or arched structure.

In principle, the air deflecting discs can be mounted in a straight setting on the shaft, thus in a 90° setting, but they can also be mounted thereon in an inclined setting. Beyond that, they can be mounted on the shaft symmetrically or asymmetrically. In corresponding manner it is merely necessary for the channel to have an appropriate bulging or adaptation in width. In the case of arrangement in an inclined setting this has the advantage that through rotation of the shaft the direction of the air flow can be constantly changed. Moreover, the air deflecting discs can also be fastened at regular or irregular intervals or also so to be—in the longitudinal direction of the shaft—pivotable and secure against rotation relative thereto. The spacings can be, for example, approximately 6 millimeters to approximately 18 millimeters. The angle of inclination can, for example, lie between 30° and 80°. If the angle of inclination is 45°, a linear arrangement can also be achieved in the curved region of the channel. If the air deflecting discs are arranged on the shaft to be pivotable in longitudinal direction, it is additionally possible to adjust these in inclination by way of connecting or coupling elements if no guide elements engage in guides. For example, the discs can be adjusted in angle against their resilient mounting by exertion of a pulling force. The pulling force is, for example, transmitted by way of a chain or by way of coupling elements to an entraining wheel with a shaft cam which runs on a circumferential path and which is actuated synchronously with the setting wheel. This entraining wheel can also have a curved circumferential path so that different inclined settings are also possible within the rotation.

The shaft itself can consist of, for example, plastics material or rubber or also of a plastics-material or steel cable or of a plastics-material cable provided with a steel core. Use is preferably made, however, of flexible plastics material which has a high polar moment of resistance. Moreover, the shaft can also be an articulated shaft. This can consist of individual sections, at the respective ends of which Cardan or ball joints are mounted which are connected with the next element so that a disc can be mounted on the section. At least the shaft can also consist of light-permeable and/or optically conductive material so that, for example, light can enter from a light source by way of the end face. The light source is for this purpose mounted on the housing or on an outer channel wall. The light source is oriented so that the light enters the shaft. Special optical effects can thereby be achieved. If the shaft is only optically conductive and no light is able to escape, for example if it is painted and light can escape only in the part where the light deflecting discs are mounted, then it can be achieved by way of this that the light exits from the faces or only from the angular edges or outer circumferential surfaces of the discs. If during production use is made of, for example, polycarbonate plastics material then it is apparent that the light can selectively escape by way of the circumferential surfaces. Special optical effects are also realisable by this means.

Figure 2:
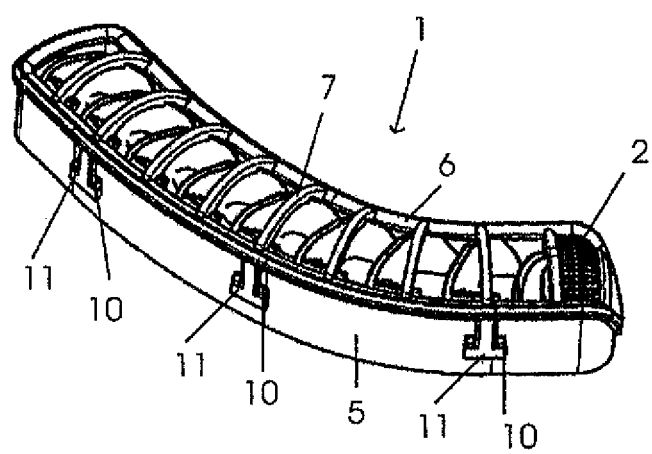
Figure 3:
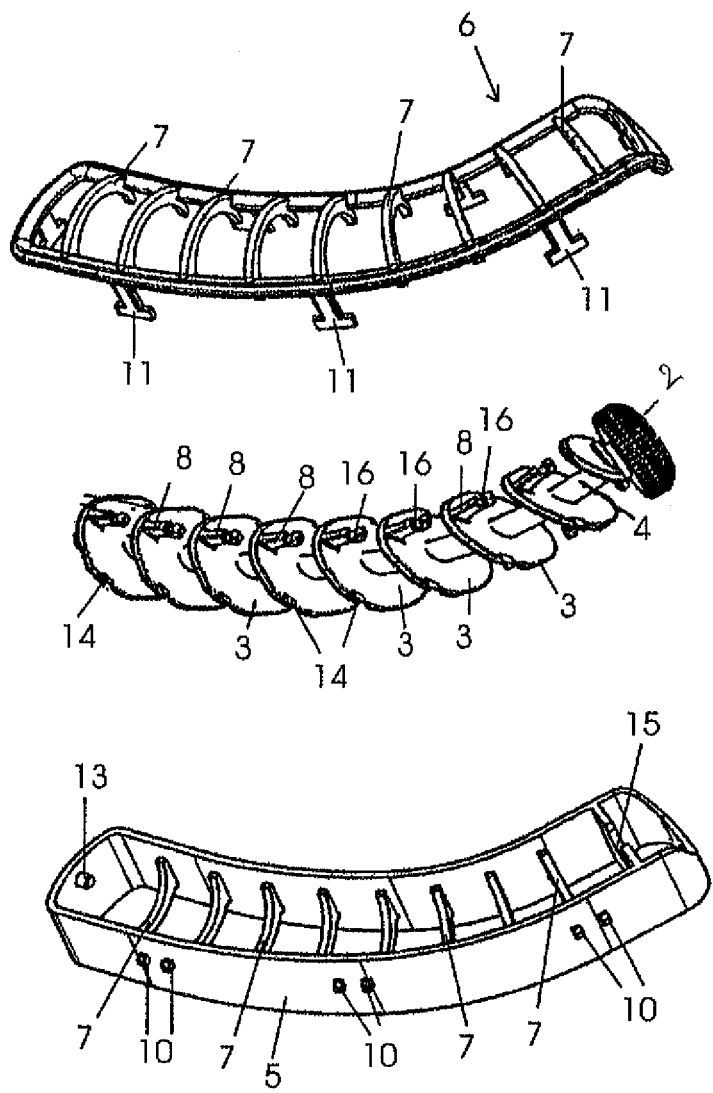

The invention is explained in more detail in the following on the basis of an exemplifying embodiment illustrated in the drawings, in which:

FIG. 1 shows an air guide channel according to the invention, designed as flat outflow means with a flexible shaft in a defined rotational setting of the control wheel, FIG. 2 shows the curved air outlet channel, which is illustrated in FIG. 1, with rotated shaft and corresponding alignment of the air deflecting discs and FIG. 3 shows an exploded illustration of the device according to FIGS. 1 and 2 with illustration of the individual components.

The example in FIGS. 1, 2 and 3 has a curved air nozzle 1 which substantially consists of a curved air outlet channel 5 having an internal structure which is rectangular in cross-section. As can be seen from FIG. 3 at the bottom, ribs 7 having an arcuate structure are formed in this air outlet channel 5. The ribs 7 are formed at a spacing corresponding with the spacing of the air deflecting discs 3, which are arranged on a flexible shaft 4. A cover 6 with ribs 7 is arranged congruently with the ribs 7 and with the air outlet channel 5. The ribs form circular guides after assembly of the air outlet channel 5 and the cover 6. The shape of such an outflow means can be virtually as desired. For example, it can, as illustrated, have a simple curved shape, but it can also have a stronger curvature, an L-shape, an S-shape and any other free shape. The channel 5 can also have a three-dimensionally oriented longitudinal course.

The shaft 4 is on the one hand fastened by one end thereof on the bearing pin 13, which protrudes at an end wall, and on the other hand inserted in a bearing socket 15 in the other end wall and fixedly held therein. In the exemplifying embodiment the shaft 4 consists of a flexible plastics material having a high polar moment of resistance so that the shaft 4 can be rotated without receiving damage and in that case at the same time still keeping the curve relatively stable in shape. Provided as bearing socket 15 is an omega mount which advantageously receives the control wheel or setting wheel 2. The control wheel 2 is fixedly connected with the shaft 4. It is evident that on rotation of the control wheel 2 the shaft 4 rotates therewith. The air deflecting discs 3 for deflecting the air flow can be individually drawn onto the shaft, but they can also be produced in a multi-component injection-moulding method together with the shaft 4. The individual air deflecting discs 3 have a diameter which is matched to the diameter of the guides formed by the ribs 7. They additionally have on one side to the right and on the other side to the left guide elements 8 which are arranged to be offset by 180° and which are injection-moulded on the discs. These guide elements 8 have a mounting groove 16 by which the guide element 8 is placed on the adjacent guide formed from the ribs 7. The respective air deflecting disc 3 is thereby always guided. However, it is also possible in principle to dispense with this if the diameters of the air deflecting discs 3 are so matched to the guide diameters that these roll by the outer edges thereof on the guides when the shaft 4 is rotated.

In addition, however, guide recesses 14 can also be present in the air deflecting discs 3, which are similarly insertable on the guides of the ribs 7 so that the discs are thereby guided at a 45° inclination setting. The air deflecting discs 3 are, for example, mounted by mechanically positive couple so that the angle of inclination thereof automatically adapts in the curved regions to the respective setting when the shaft 4 is rotated.

In principle, the setting wheel 2 or a motorised drive can be provided at any desired location on the shaft 4 or co-operate therewith by way of an intermediate transmission. Several setting or control wheels 2 can also be provided. Equally, the buttons for control of an electronic drive can be fastened to be offset with respect to the air outlet channel 5 at a wall of a space.

In the exemplifying embodiment the setting wheel 2 can be rotated through more than 360° since no abutment restricts the rotational movement. The inclined settings and the positions of the air deflecting discs 3 mounted at an inclination on the shaft 4 correspondingly repeat. The cover 6 is constructed as a screen. It is fastened in detenting manner by means of detent tongues 11 behind detent projections 10 at the side walls of the air outlet channel 5. The closed unit is illustrated in FIGS. 1 and 2. A rotational movement is apparent from FIG. 1, in which the guide elements 8 are visible. Through rotation of the setting wheel 2 a rotational setting is adopted in FIG. 2 in which completely different inclined settings, which are dependent on rotational position, of the air deflecting discs 3 are to be noted.

REFERENCE NUMERAL LIST 1 curved air nozzle
2 rotary drive/setting wheel
3 air deflecting discs
4 shaft
5 curved air outlet channel
6 cover
7 ribs
8 guide element
10 detent projections
11 detent tongues
13 bearing pins
14 guide recess
15 bearing socket
16 bearing groove

The invention claimed is:

1. An air vent for conducting air flows, particularly for heating, air-conditioning and ventilating installations in motor vehicles, comprising at least one housing (5), a shaft (4) with air deflecting discs (3) mounted thereon and a rotary drive (2) for adjusting the shaft (4), wherein the housing (5) of the air vent (1) has an air outlet channel (5) with a longitudinally curved structure or such an air outlet channel (5) is mounted on the housing, wherein the shaft (4) is a flexible shaft (4) or an articulated shaft and comprises a longitudinally curved structure corresponding to the longitudinally curved structure of the air outlet channel, wherein airflow is parallel with a central axis of curvature of the longitudinally curved structures of the shaft and air outlet channel, and wherein the air deflecting discs (3) are mounted on the shaft (4) fixedly or loosely, but secure against rotation relative thereto, in such a manner that they rotate with the shaft (4), and wherein the deflecting discs bear against inner sides of the air outlet channel.

2. The air vent according to claim 1, wherein the air outlet channel (5) has a two-dimensional or three-dimensional L-shape, a wave shaft, an S-shape, a circular shape, an arcuate shape or a combination of at least two thereof, extending in longitudinal direction.

3. The air vent according to claim 1, wherein the air outlet channel (5) has sections of varying dimensions and wherein the air deflecting discs have dimensions corresponding to the dimensions of the section in which they are mounted.

4. The air vent according to claim 1, wherein as rotary drive (2) a setting wheel (2) is fastened on the shaft (4) at at least one location or a motorized, particularly an electric motor, drive is provided.

5. The air vent according to claim 4, wherein the drive (2) is movable steplessly or at defined angles and/or in addition is settable.

6. The air vent according to claim 1, wherein the air deflecting discs (3) and/or the setting wheel (2) is or are mounted by mechanically positive couple or frictional couple on the shaft (4).

7. The air vent according to claim 1, wherein the shaft (4) is produced together with the air deflecting discs (3) and/or the setting wheel (2) as an injection-molded part.

8. The air vent according to claim 1, wherein the air deflecting discs (3) are constructed in a round or oval, flat, bent, arched or wavy structure or have a free shape.

9. The air vent according to claim 1, wherein the air deflecting discs (3) are fastened on the shaft (4) in an inclined setting.

10. The air vent according to claim 9, wherein the inclined setting of the air deflecting discs (3) is arranged at an angle between 30° and 80° relative to the longitudinal axis of the shaft (4).

11. The air vent according to claim 1, wherein the air deflecting discs (3) are fastened centrally on the shaft (4) at regular or irregular intervals or to be pivotable in longitudinal direction of the shaft (4), but secure against rotation relative thereto.

12. The air vent according to claim 1, wherein the air deflecting discs (3) have at at least one side a guide element (8) with at least one mounting groove (16) in which an associated arcuate guide (7) engages in the channel (5) and/or in an air-permeable cover (6) connected therewith.

13. The air vent according to claim 12, wherein the arcuate guide is formed from ribs (7) in the cover, which is placeable on the channel (5) and fastenable thereto, and from ribs (7) in the curved channel (5).

14. The air vent according to claim 13, wherein at least one further guide element (8) and/or guide recess (14) is or are provided at the air deflecting discs (3), which similarly engages or engage the ribs (7) of an arcuate guide (13).

15. The air vent according to claim 12, wherein in each instance at least one guide element (8) is arranged on the front side and on the rear side of the disc surface of the air deflecting discs (3).

16. The air vent according to claim 1, wherein the shaft (4) consists of plastics material or rubber or is a plastics-material or steel cable.

17. The air vent according to claim 1, wherein the shaft of the air vent (1) consists of light-permeable and/or optically conductive material.

18. The air vent according to claim 17, wherein at least one lighting means is so arranged in the air nozzle (1) that at least a part of the light enters the shaft (4).

19. The air vent according to claim 17, wherein at least the shaft (4) and/or the air deflecting discs (3) consists or consist of fluorescent polycarbonate material (LISA material) or are coated in such a manner that the light escapes only at the edges of the air deflecting discs (3).

* * * * *